3,376,230
STABILIZED SOLUTIONS OF FERRIC CHLORIDE IN TOLUENE DIISOCYANATE

Herbert Felix McShane, Jr., Wilmington, Del., assignor to E. I. du Pont de Nemours and Company, Wilmington, Del., a corporation of Delaware
No Drawing. Filed Jan. 8, 1965, Ser. No. 424,186
6 Claims. (Cl. 252—188.3)

ABSTRACT OF THE DISCLOSURE

This invention is directed to a solution of ferric chloride and toluene diisocyanate stabilized with halogen such as chlorine, said halogen being dissolved in said diisocyanate prior to adding ferric chloride.

---

This invention relates to the stabilization of solutions of ferric chloride in tolylene diisocyanate (TDI) against the formation of insoluble precipitates, with the resultant solutions being especially suitable for the large-scale commercial manufacture of ring-halogenated tolylene diisocyanates.

The advantages of the ring-halogenated tolylene diisocyanates over their nonhalogenated analogs in the preparation of rigid and flexible foams, adhesive coatings, and highly abrasion-resistant elastomeric materials are well known in the art. Compositions derived from halogenated aromatic isocyanates show enhanced flame resistance which is an important factor in the practical use of resinous isocyanate products. The preparation of ring-halogenated aromatic isocyanates is described, for example, in U.S. Pat. No. 2,915,545.

In the halogenation of aromatic isocyanates, and particularly in the halogenation of alkyl-substituted aromatic isocyanates such as tolylene diisocyanate, a widely used component of polyurethane resins, it is essential to employ a catalyst of the Lewis acid type. In the absence of such a catalyst, substantial amounts of halogen substitution take place on the alkyl substituents of the aromatic ring, giving undesirable, hydrolytically unstable α-halogenated products. In the presence of suitable catalysts under preferred conditions, halogenation of the tolylene diisocyanates, in particular, can be directed almost exclusively to ring substitution, rather than α-halogenation, to yield the desired halogenated tolylene diisocyanates.

Among the most effective catalysts for ring-halogenation of tolylene diisocyanates are the ferric halides, including ferric chloride, ferric bromide, and ferric iodide. Of these, anhydrous ferric chloride is generally preferred because of its ready availability and relatively low price. Ferric chloride as normally employed, i.e., as the solid anhydrous salt, can be handled quite satisfactorily in small scale laboratory operations. However, its physical and chemical characteristics are such that in commercial scale manufacture, either in batch or continuous operations, the use of ferric chloride presents difficult problems. Its physical nature, i.e., its tendency to agglomerate and plug channels and openings is such that mechanical feeding of solid ferric chloride is troublesome. If ferric chloride is dissolved in tolylene diisocyanate to be fed to a halogenation reactor as a solution, as suggested in U.S. Pat. No. 2,915,545, chemical changes and interactions of undefined character cause the formation of insoluble precipitates or sludge that eventually foul the reactor and contaminate the halogenated tolylene diisocyanate product. In other words, the use of ferric chloride as catalyst for halogenation of tolylene diisocyanate by procedures suggested in the prior art is unsatisfactory for operation on a commercial scale.

It is an object of this invention to provide a method of adding ferric chloride to tolylene diisocyanate without the accompanying difficulties experienced by the prior art and to provide the resultant stable catalyst solutions. A particular object is to provide a process for incorporating the ferric chloride catalyst into tolylene diisocyanate prior to halogenation of the isocyanate, in which process a stable solution of the catalyst in the isocyanate is formed. Other objects will appear hereinafter.

It has been discovered that stable solutions of ferric chloride in tolylene diisocyanate can be prepared by adding a small amount, relative to the amount used to ring-halogenate the diisocyanate, of chlorine or bromine to the diisocyanate and then adding the ferric chloride (anhydrous) catalyst to the diisocyanate. This order of addition, with the halogens mentioned being employed in effective stabilizing amounts, prevents the formation of all but insignificant amounts of the insoluble products that form when ferric chloride is added without earlier halogen addition. The resultant solutions made according to the present discovery are stable for relatively long periods, i.e., for several days or even months under suitable storage conditions, i.e., moderate or low temperatures. The storage temperature should not be below the freezing temperature of the diisocyanate.

The stable solutions of the present invention consist of tolylene diisocyanate having dissolved therein ferric chloride catalyst and a stabilizing amount of chlorine or bromine with respect to the amount of catalyst added. These stable solutions are particularly useful in the halogenation of the tolylene diisocyanate by the conventional procedure of passing halogen through the solution. A preferred halogenation procedure is to agitate at a temperature between about 60 and 135° C. the stable diisocyanate-catalyst solution throughout so that intimate contact between the halogen reactant and the diisocyanate is obtained and to remove rapidly the hydrogen halide by-product so that its concentration lies below 0.6 meq./g. of the reaction mass, excluding any non-reactive solvent that might be present.

Generally, the storage stable catalyst solution is prepared in one vessel and is then passed to another vessel for halogenation of the diisocyanate. According to this general procedure, it has been found that it is not necessary to empty completely the catalyst solution preparation vessel used, but that a small amount of the catalyst solution remaining in this vessel after emptying has no adverse effect on the stability of the next batch of catalyst solution made therein according to the present invention.

In greater detail with respect to the preparation of the stable solutions, the temperature of addition of the stabilizing and catalyst ingredients to tolylene diisocyanate is between 15° C. and 75° C. The lower temperature corresponds roughly to the temperature at which a mixture of 80% 2,4- and 20% 2,6-tolylene diisocyanate, a common commercial product, begins to solidify; the present invention is not limited to these percentages but is applicable to the presently available tolylene diisocyanates in which from 0 to 35% of 2,6-isomer is present. Above about 75° C., sludges tend to form in the catalyst solution. The preferred temperature range is 40–60° C., in which range, the formation of the desired solution is rapidly obtained without the formation of undesired insolubles.

Generally, the amount of chlorine or bromine or mixtures thereof required to yield a stable solution of ferric chloride catalyst in the diisocyanate will depend on the amount of catalyst to be added. The amount of insolubles that form when ferric chloride is added to the diisocyanate according to conventional practice appears to decrease noticeably upon very small precedent additions of chlorine or bromine, with about 0.1 mole thereof per mole of ferric chloride being a practical lower limit. The limit. The upper limit for halogen stabilizer addition is about 0.65 mole per mole of ferric chloride, with increasing proportions of halogen yielding increasing amounts of insolubles. The subsequent use of the stable solution in which halogen is passed through the solution to effect ring-halogenation of the diisocyanate does not have this effect apparent ly for the reason that the available halogen is quickly taken up by the aromatic nuclei of the diisocyanate. The most effective proportion of chlorine or bromine stabilizer is that which has the greatest stabilizing effect on the ferric chloride under the conditions employed. Hence, the effective or stabilizing amount of stabilizer can be determined by routine experiments on the particular set of operating conditions desired.

The same is true with respect to the amount of ferric chloride catalyst employed. Good results are obtained when the catalyst concentration is no greater than about 0.016 mole per mole of tolylene diisocyanate. The minimum proportion of catalyst will depend on the temperature at which subsequent ring-halogenation reaction is conducted since high temperatures favor α-halogenation of the diisocyanate rather than ring halogenation. Consequently, at such temperatures, e.g. 125–135° C., the minimum proportion catalyst should be high, within the above maximum, and at lower temperatures, lower proportions are suitable. At moderate ring-halogenation temperatures of 80 to 115° C., as little as 0.006 mole of ferric chloride per mole of diisocyanate is generally suitable, while at lower temperatures such as 60° C., as little as 0.004 mole is suitable. One skilled in the art can readily determine the optimum catalytic amount of ferric chloride by first deciding on the conditions under which the stable catalyst solution is to be used and then by conducting routine experimentation to determine the amount of catalyst most advantageously employed.

In the preparation of the stable catalyst solutions of the present invention, it is important that the ferric chloride be added in effective time after the halogen stabilizer has been introduced into the diisocyanate, otherwise the stabilizing effect is not obtained. Generally an effective time is within a period of 30 minutes and preferably within 2–5 minutes. Apparently, the ferric chloride must be present during the first, active period of formation of hydrogen halide by attack of the stabilizer on the aromatic nucleus of the diisocyanate.

The following examples are representative of the present invention. Parts and percents are by weight unless otherwise indicated.

Example 1

About 50 grams (0.7 mole) of chlorine are added rapidly to about 17,000 grams (97.6 moles) of a mixture of 80% 2,4- and 20% 2,6-tolylene diisocyanate at 40° C. in a well-agitated reaction kettle under an atmosphere of dry nitrogen. Immediately thereafter are added about 252 grams (1.55 moles) of anhydrous ferric chloride. The resulting solution is stirred for about ten minutes and is found to contain only about 10 grams of insoluble material by filtration through coarse filter paper. The resulting solution, which contains about 1.4% ferric chloride by weight, is cooled to room temperature and stored under dry nitrogen for use in a halogenation reaction.

Example 2

Following the procedure of Example 1, 0.18 mole of chlorine are used at 26° C. One hundred twenty-six grams of black, insoluble matter is found on filtration, but the solution is stable and does not give any further precipitate on aging.

Example 3

Following the procedure of Example 1, 0.82 mole of chlorine are used at 26° C. Ten grams of black, insoluble matter is found on filtration. The filtered solution is stable, and does not give any further precipitate on aging.

Example 4

Following the procedure of Example 1, 0.92 mole of chlorine are used at 38° C. Only a small amount of immediate precipitate is formed. After filtration a small amount of yellow precipitate is formed on aging.

Example 5

Following the procedure of Example 1, the solution is heated from 25 to 46° C. over a period of 30 to 45 minutes between the chlorine addition and the addition of $FeCl_3$. Large amounts of a yellow precipitate form on aging the solution.

Example 6

Following the procedure of Example 1, 0.69 mole of bromine are used instead of chlorine at 40° C. 13.5 grams of black, insoluble matter is found on filtration. The solution is stable for about two weeks, after which time a small amount of a yellow precipitate forms.

As many widely different embodiments of this invention may be made without departing from the spirit and scope thereof, it is to be understood that this invention is not limited to the specific embodiments thereof except as defined in the appended claims.

What is claimed is:
1. A stable solution consisting essentially of tolylene diisocyanate having dissolved therein a catalytic amount up to about 0.016 mole of anhydrous ferric chloride per mole of said diisocyanate and a stabilizing amount of halogen selected from the group consisting of chlorine, bromine, and mixture thereof, said halogen being dissolved in said diisocyanate prior to said ferric chloride catalyst being dissolved therein.
2. The solution of claim 1 wherein up to 0.016 mole of said ferric chloride is present per mole of said tolylene diisocyanate.
3. The stable solution of claim 1 wherein up to 0.65 mole of said halogen is present per mole of said ferric chloride.
4. The stable solution of claim 1 wherein said tolylene diisocyanate is an 80:20 mixture of the 2,4- and 2,6-isomers thereof.
5. A process for minimizing the formation of insolubles when anhydrous ferric chloride is dissolved in tolylene diisocyanate and for stabilizing the resultant solution, comprising prior to dissolving said ferric chloride in said tolylene diisocyanate adding thereto at a temperature within the range of 15 to 75° C. a stabilizing amount of a halogen selected from the group consisting of chlorine, bromine, and mixtures thereof and thereafter dissolving at a temperature within said range said ferric chloride in said tolylene diisocyanate within 30 minutes to obtain a stable solution of ferric chloride in tolylene diisocyanate.
6. The process of claim 5 wherein said ferric chloride is added immediately after said halogen.

References Cited

UNITED STATES PATENTS

| | | | |
|---|---|---|---|
| 2,083,692 | 6/1937 | Dorph et al. | 23—87 |
| 2,096,855 | 11/1937 | Ladd | 23—87 |
| 2,915,545 | 12/1959 | Tazuma | 260—453 |

OTHER REFERENCES

"Encyclopedia of Chemical Reactions," C. A. Jacobson, Reinhold Publishing Corp., 1951, page 53.

DANIEL E. WYMAN, *Primary Examiner.*

C. F. DEES, L. G. XIARHOS, *Assistant Examiners.*